United States Patent
Goglin et al.

(10) Patent No.: US 7,792,960 B2
(45) Date of Patent: Sep. 7, 2010

(54) DETECTING AUTOMATION CHEATING IN ONLINE APPLICATIONS

(75) Inventors: Stephen D. Goglin, Hillsboro, OR (US); Travis T. Schluessler, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 11/998,836

(22) Filed: Nov. 30, 2007

(65) Prior Publication Data

US 2009/0144415 A1    Jun. 4, 2009

(51) Int. Cl.
*G06F 15/16* (2006.01)

(52) U.S. Cl. .................. 709/224; 709/203; 726/22

(58) Field of Classification Search .......... 709/224, 709/203; 726/22
See application file for complete search history.

(56) References Cited

U.S. PATENT DOCUMENTS

| | | | |
|---|---|---|---|
| 7,169,050 B1 * | 1/2007 | Tyler | 463/42 |
| 7,288,027 B2 * | 10/2007 | Overton | 463/42 |
| 7,480,656 B2 * | 1/2009 | Harris et al. | 1/1 |
| 7,517,282 B1 * | 4/2009 | Pryor | 463/42 |
| 2004/0093372 A1 * | 5/2004 | Chen et al. | 709/203 |
| 2008/0004107 A1 * | 1/2008 | Nguyen et al. | 463/29 |
| 2008/0182659 A1 * | 7/2008 | Sabella et al. | 463/29 |
| 2009/0143144 A1 | 6/2009 | Schluessler et al. | |
| 2009/0144825 A1 | 6/2009 | Schluessler et al. | |

OTHER PUBLICATIONS

Schluessler et al. "Is a Bot at the Controls? Detecting Input Data Attacks" by Schluessler, T., Goglin, S. and Johnson, E. published for Netgames '07, Sep. 19-20, 2007, pp. 1-6.*
Kim et al. "Detection of Auto Programs for MMORPG's" Springer Berlin, AI 2005: Advances in Artificial Intelligence, vol. 3809, pp. 1281-1284.*
"4.5 million copies of EULA-compliant spyware" by Greg "hoglund" at rootkit.com, dated Oct. 6, 2005. 3 pages printed from rootkit.com/blog.php?newsid=358.*
Schluessler, et al., "Is a Human at the Controls?—Detecting Input Data Attacks", [The paper was submitted on Feb. 3, 2007 for inclusion in the USENIX Security Symposium, Aug. 6-10, 2007, Boston Mass (not accepted for inclusion in Symposium)], 16 pages.

* cited by examiner

*Primary Examiner*—David Lazaro
(74) *Attorney, Agent, or Firm*—Ryder, Lu, Mazzeo and Konieczny, LLC; Douglas J. Ryder

(57) ABSTRACT

In general, in one aspect, a method is described that includes monitoring data received from input devices. The received data from the input devices associated with an application is copied when the application is active. The data is converted to user commands. Commands used to update the application are received from the application. The converted user commands are compared to the commands from the application. Mismatching commands are reported to a remote server.

22 Claims, 5 Drawing Sheets

DETECTING AUTOMATION CHEATING IN ONLINE APPLICATIONS

BACKGROUND

The online video game market continues to grow. Online games may be played on personal computers (PCs) or gaming consoles (e.g., XBOX LIVE®). PCs are open systems and therefore are susceptible to hacking. Hacking online games played on PCs may enable users to cheat while playing the game. The cheating may include replacing ones skills and reflexes with the speed and power of the PC (automation cheats, input cheats). The automation cheats may work by having the PC figure out what course of action to take in the game and supplying the necessary input to the game in order for the appropriate action to occur. The PC may provide the necessary input to the game, may delete input provided by the user (the human input), or may modify the human input. The game is tricked into thinking the user has provided the input (performed the action).

For example, certain games require a player to aim and shoot at various objects or other players. The PC may be able to determine the exact location of the target and automatically aim and shoot the player's gun with inhuman accuracy and speed. Some games require players to perform repetitious tasks in order to obtain certain items (game currency) and/or to advance to new levels. The PC may perform the repetitive tasks for the user without the user needing to play the game and perform the functions. This allows the user to accumulate wealth, skills or other game features faster and vastly easier than the rest of the players in the game.

BRIEF DESCRIPTION OF THE DRAWINGS

The features and advantages of the various embodiments will become apparent from the following detailed description in which.

DETAILED DESCRIPTION

Figure 1:
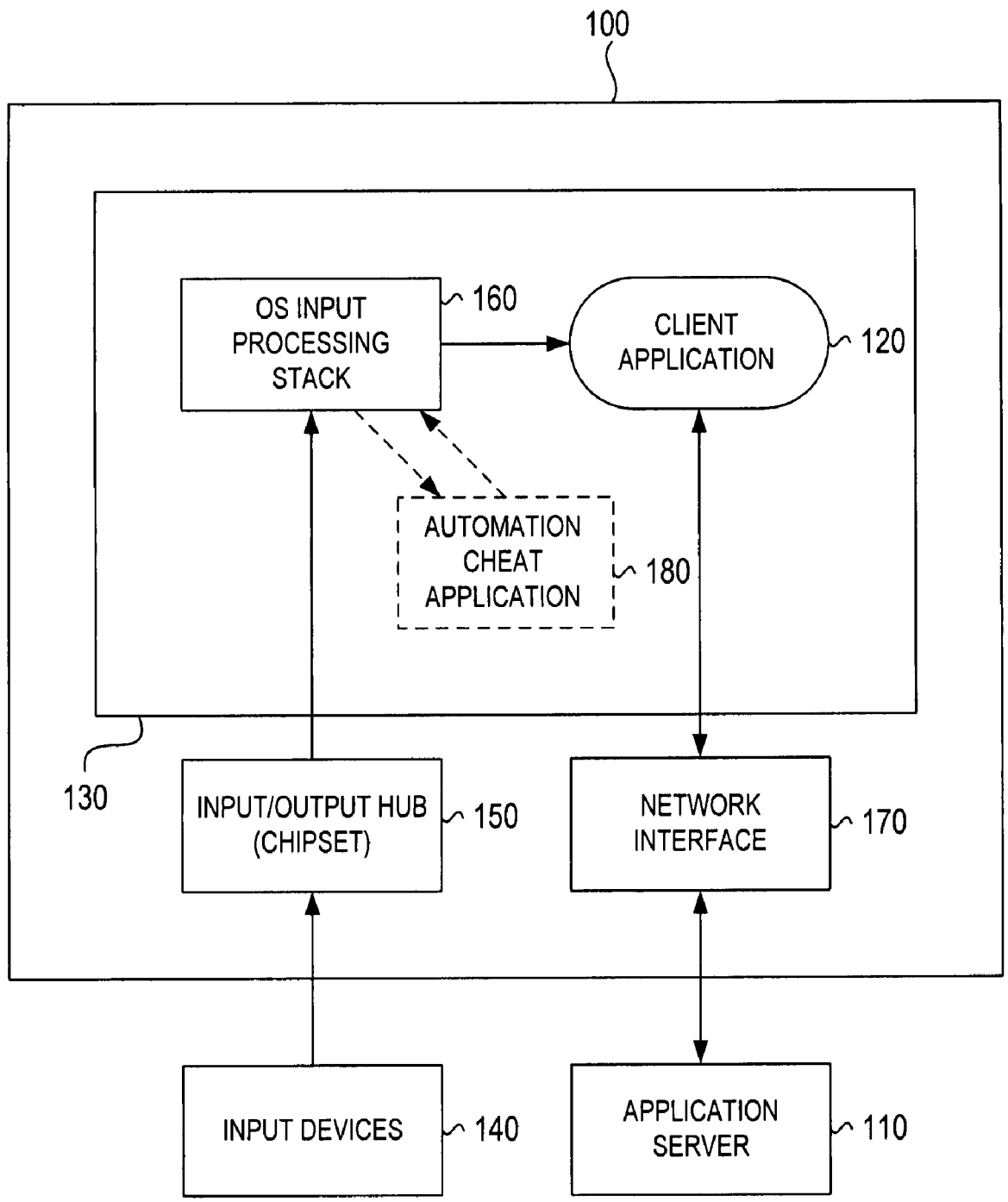
FIG. 1 illustrates an example on-line game configuration, according to one embodiment.

FIG. 1 illustrates an example on-line game configuration where a user plays a game on their computer 100 and interacts with other users via an application server 110 (remote server). A client application of the game 120 is run on a central processing unit (CPU) 130 in the computer 100. The user may utilize an input device 140 (e.g., mouse, keyboard, joystick) to enter commands (e.g., scroll mouse, press keys) in order to play the game. The input device 140 transmits data capturing the user commands to the computer 100 where it is received by an input/output control hub (ICH) 150 (chipset). The ICH 150 forwards the data to the processor 130 where it is processed by an operating system (OS) input processing stack 160.

The OS input processing stack 160 utilizes appropriate drivers to convert the data (e.g., bit strings) to corresponding "human" commands (e.g., the 'A' key was pressed, the mouse was moved left). The OS input processing stack 160 forwards the "human" commands to the client application 120. The client application 120 processes the "human" commands received in order to update/advance the game (modify the game state). Updates to the game are communicated from the client application 120 to the application server 110 over a communication network (e.g., Internet) via a network interface 170 (e.g., modem, wireless card, Ethernet cable port, coaxial cable port).

An automation cheat application 180 may be run on the CPU 130 to analyze game play to determine the commands necessary to increase score (e.g., aim more accurately, fire faster) or to perform repetitive tasks (e.g., dig for gold). The automation cheat application 180 may receive the user commands and may delete some portion of the commands (e.g., remove commands associated with an accidental shot), may modify some portion of the commands (e.g., aim a shot more accurately), and/or may add commands (e.g., shoot more often). The modified commands are then provided to the client application 120. The automation cheat application 180 need not receive any commands from the user and can simply play the game in place of the user by providing commands directly to the client application 120. For example, the automation cheat application 180 may utilize the CPU 130 to continually provide the necessary commands to the client application 120 for repetitive tasks (e.g., digging for gold). The client application 120 is unaware that the commands it is receiving are not from a user (e.g., has been inserted or modified by the automation cheat application 180) or that the automation cheat application 180 may have deleted commands from a user.

To prevent users from utilizing the automation cheat application 180 to inject, remove, or modify the input stream (human commands) provided to the client application 120 in order to cheat, the computer 100 may monitor commands received from the user and compare the received commands to the commands provided to the client application 120. If the comparison determines that the commands received and commands provided are not the same then the commands must have been derived from a non-human source, such as the automation cheat application 180.

Figure 2:
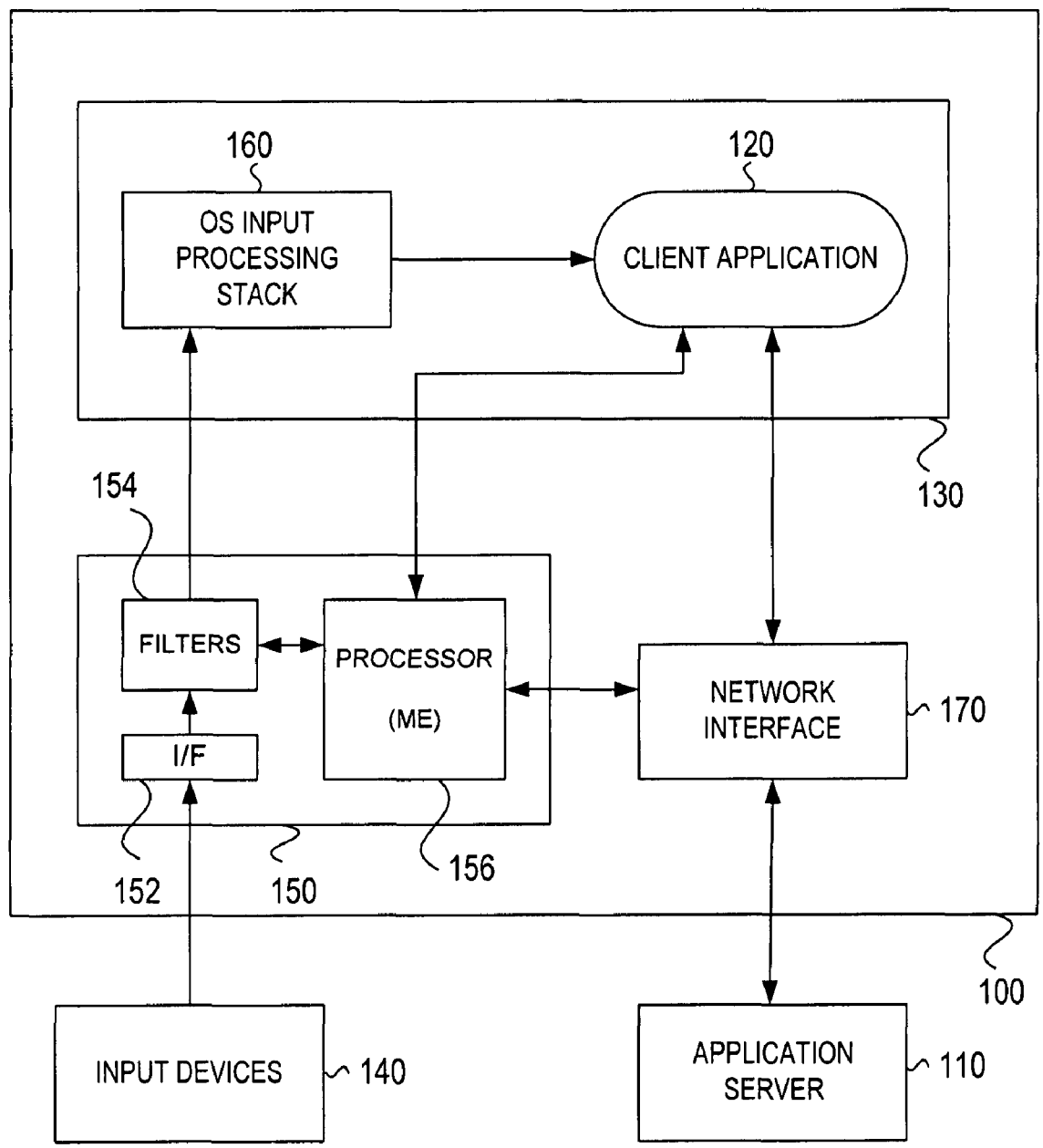
FIG. 2 illustrates an example on-line game configuration for verifying user commands are used to advance game play, according to one embodiment.

FIG. 2 illustrates an example on-line game configuration used to verify user commands that are used to advance game play. The configuration is similar to the configuration discussed with respect to FIG. 1. The ICH 150 includes a processor 156 and memory (not illustrated) and has direct connections to the CPU 130 and the network interface 170. The processor 156 is an isolated execution environment that is independent of the CPU 130 and the operating systems and other applications running on the CPU 130. The processor 156 may store encryption and/or signed network keys in its associated memory that is inaccessible from the host CPU 130 and use these for secure communications. The outside environment does not have access to the processor 156 or its associated memory and thus cannot manipulate any actions occurring therein. The ICH 150 also includes one or more interfaces 152 (e.g., USB) to receive data from one or more input devices 140 and one ore more filters 154 to monitor incoming data from the input devices 140 for commands associated with game play. The filters 154 may be hardware devices. The processor 156 may be a manageability engine (ME) such as that contained in Intel® chipsets with Active management Technology. The ME 156 may be configured to perform user command validation.

The client application 120 may provide configuration data to the ME 156. The configuration data may include identification of acceptable type of input devices 140 (e.g., mouse and keyboard may be used, track ball can not). The client application 120 may obtain unique addresses (e.g., USB) assigned to acceptable input devices 140 that are connected to the computer 100 and may provide the list of input source addresses to the ME 156 as part of the configuration data. Alternatively, the ME 156 may obtain the addresses for the input devices 140 from the ICH 150. The configuration data may also include information about the application server 110 (e.g., IP address) so that the ME 156 can communicate directly therewith.

The ME 156 may use the configuration data to configure the filters 154 to look for data (e.g., bit strings associated with a command or action) from the addresses associated with the accepted input devices 140. The interfaces 152 receive data from the input devices 140 and pass the data through the filters 154. When game play is active, the filters 154 monitor the data received to determine if the origin is from an accepted input device. If the filters 154 determine the data is not from an accepted input device, the data is simply forwarded to the OS input processing stack 160. If the filters 154 determine the data is from an accepted input device, the filters 154 make a copy of the data for the ME 156 and also forward the data to the OS input processing stack 160.

The client application 120 receives and processes application commands in order to update/advance the game (modify the game state). In normal operation the application commands would be based on data from the input devices. However, the application commands may be modified in some fashion by a cheat application as discussed above with respect to FIG. 1. The client application 120 forwards modifications to the game state to the application server 110. In addition, the client application 120 passes the application commands received and used to update the game to the ME 156.

The ME 156 may convert the data received from the filters 154 into user commands (e.g., change bit strings to mouse presses). The ME 156 may then compare the user commands generated in the ME 156 to the application commands received from the client application 120. The user and application commands may be placed in queues when received by the ME 156 and then taken out of the queues on a first in first out (FIFO) basis for the comparison. After the comparison the ME 156 discards the user and application commands.

The ME 156 may provide the application server 110 and the client application 120 with notification of non-matching commands. The ME 156 may provide the notification based on a single instance of non-matching commands or some algorithm (e.g., 5 consecutive commands, 50% of commands over a defined interval). The notification may simply indicate non-matching has occurred or may provide details regarding the level of non-matching.

The ME 156 may package the notification into encrypted or signed network packets and forward the encrypted or signed network packets to the application server 110. The server application 110 may receive the encrypted or signed network packets from the ME 156 and utilize encryption and/or signed network keys to extract the notification therefrom. Using encryption or signed networks ensures that the communications of the notification to the application server 110 is secure (that it is from the ME 156).

The application server 110 receives the notification from the ME 156 and makes a determination if cheating is occurring based thereon. The application server 110 may determine cheating is occurring after receipt of a single notification from the ME 156 or may base the decision on some algorithm (e.g., reach threshold level of notifications/mismatches in a defined period). If the application server 110 determines that cheating is occurring (e.g., utilizing automation cheats) the application server 110 may take appropriate action (e.g., provide warning, discontinue play, ban user, ban game play from that machine, notify other players). The action taken by the application server 110 may depend on, for example, the level of cheating determined, if cheating has previously been detected for the user or from the machine, and/or if previous action has been taken against the user/machine.

Some input devices 140 may utilize drivers that convert user commands in some fashion (e.g., convert data associated with a single key stroke into a plurality of key strokes, covert data associated with various keys to a single key). If the game (client application 120 and/or application server 110) allows the actual user commands to be converted then the application commands received by the client application 120 will be based on the associated conversion rules being applied to the data received. The client application 120 may have a defined set of conversion rules (drivers) that are allowed. If new conversion rules are proposed by a user and/or their input device 140, the client application 120 may communicate with the application server 110 to determine if the conversion rules are acceptable to the application server 110. If the application server 110 determines that the conversion rules are acceptable, the application server 110 may notify the client application 120 and the client application 120 may enable a user to use these conversion rules (drivers) and/or input device 140. If the application server 110 determines that the conversion rules are not acceptable, the application server 110 may notify the client application 120 to not permit implementation of the conversion rules and/or use of the input device 140.

In order to accurately compare the human commands generated by the ME 156 to the application commands received from the client application 120, the ME 156 needs to apply the same conversion rules to the data received from the input devices 140. Accordingly, conversion rules that are acceptable to the game need to be provided to the ME 156. The ME 156 may use the conversion rules to convert the data into human commands in the same fashion that the OS input processing stack 160 would. The conversion rules may be provided to the ME 156 as part of the configuration data.

If a user uses an input device 140 that uses drivers and/or macros that are not authorized, the conversion rules will not have been provided to the ME 156 and the comparison of human commands and application commands performed by the ME 156 will not match since the client application 120 will have processed commands using the conversion rules and the ME 156 will not have.

Some input devices 140 may be able to capable of being programmed to modify user commands or insert command sequences with little/no user interaction and forward the data associated with the modified/inserted commands to the computer 100. For example, the input device 140 may send data associated with multiple keystrokes (e.g., shoot, reload, aim) to the computer 100 based on a single keystroke from the user (e.g., shoot). Alternatively, the input devices 140 may provide the data associated with multiple command sequences that are required for certain tasks to the computer 100 with little or no input from the user. Since the modification of the user commands is done outside of the computer 100, the ME 156 would not be able to detect this modification. However, the use of these input devices 140 to modify user commands may still be considered a form of input/automation cheating.

To prevent this type of cheating, the application server 110 may optionally provide the ME 156 with a list of input devices 140 that may not be used for game play (known programmable input devices) or alternatively with a list of input devices 140 that have been approved for use. The ME 156 may optionally scan the computer 100 to learn more about the input devices 140 connected thereto (e.g., such as product name, version, manufacturer) and compare the connected input devices 140 to the list of input devices 140 provided by the application server 110. If the ME 156 receives input from an input device 140 that is not accepted/not approved for use, the ME 156 may provide notification to the application server 110. The application server 110 may then take appropriate action (e.g., provide warning, discontinue play, ban user, ban game play from that machine). The action taken by the application server 110 may depend on, for example, if cheating has previously been detected for the user or from the machine, and/or if previous action has been taken against the user/machine.

Alternatively, the input devices 140 may include a certification code that validates that the input device 140 is not a cheat capable device (e.g., can not be programmed to modify user commands). The ME 156 may scan the computer 100 to look for the input devices 140 connected thereto having the certification code. The ME 156 may notify the application server 110 if data is being received by non certified input devices 140 during game play.

Figure 3:
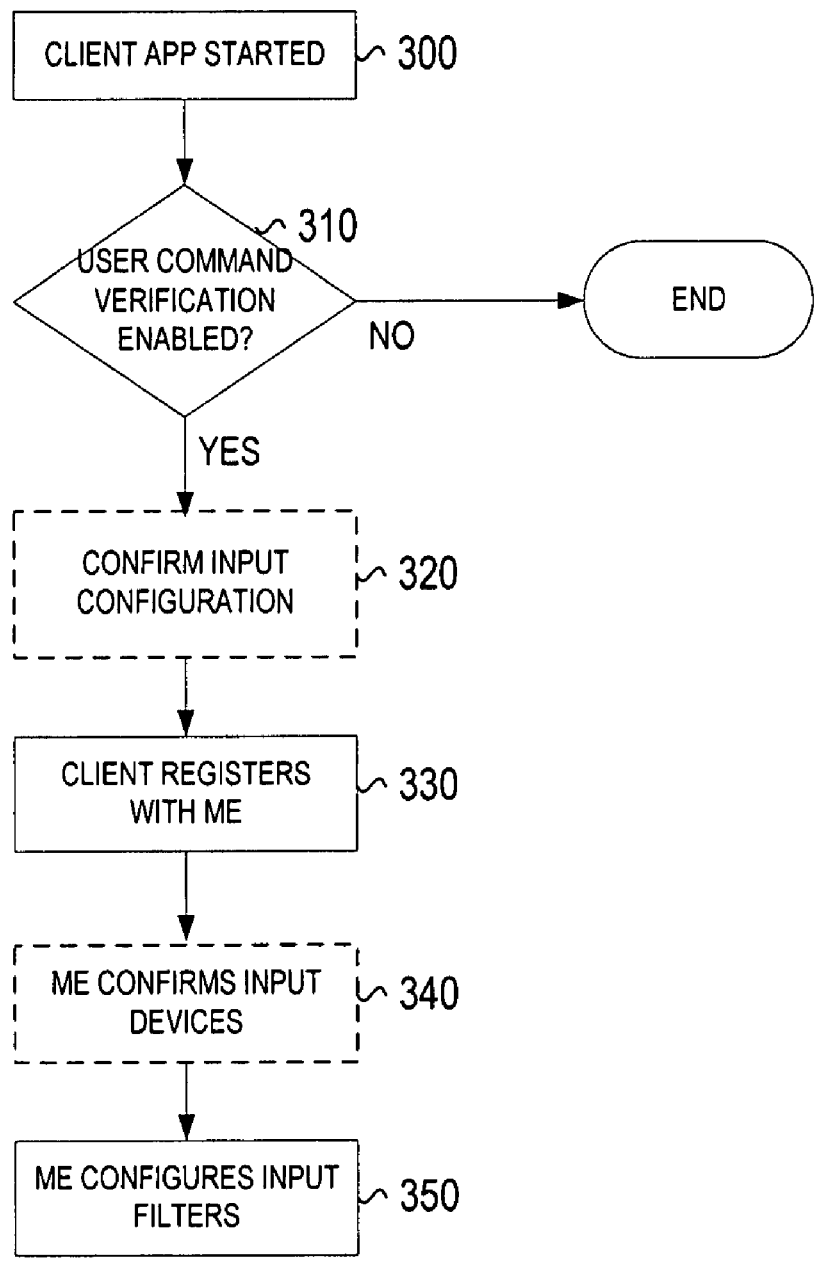
FIG. 3 illustrates an example process flow for user command verification initialization, according to one embodiment.

FIG. 3 illustrates an example process flow for user command verification initialization. Initially, the game application is started 300. A determination is made as to whether the user command verification is enabled 310. It should be pointed out that for the verification to be enabled the game (client application and application server) have to be configured and that the computer has to have the appropriate equipment (e.g., filters, ME). If the verification is not enabled 310 No, the process ends since no further action can be taken until the verification is enabled.

If the verification is enabled 310 Yes, the game configuration set by the user may optionally be confirmed 320. The confirmation of the game configuration may include confirming that any drivers used to convert data received to user commands are acceptable for game play. The client application may communicate with the application server to confirm if the drivers (e.g., newly proposed drivers) can be utilized for game play. The client application then registers with the ME 330. The registration includes providing the ME with type of input devices allowed, any specialized drivers that may be utilized in game play, and contact data for the application server. The registration may also entail providing addresses for the input devices.

The ME may optionally scan the computer to learn more about the input devices connected thereto in order to determine if the input devices are acceptable for game play 340. The ME configures the filters to look for data from certain input devices during game play 350.

Figure 4A:
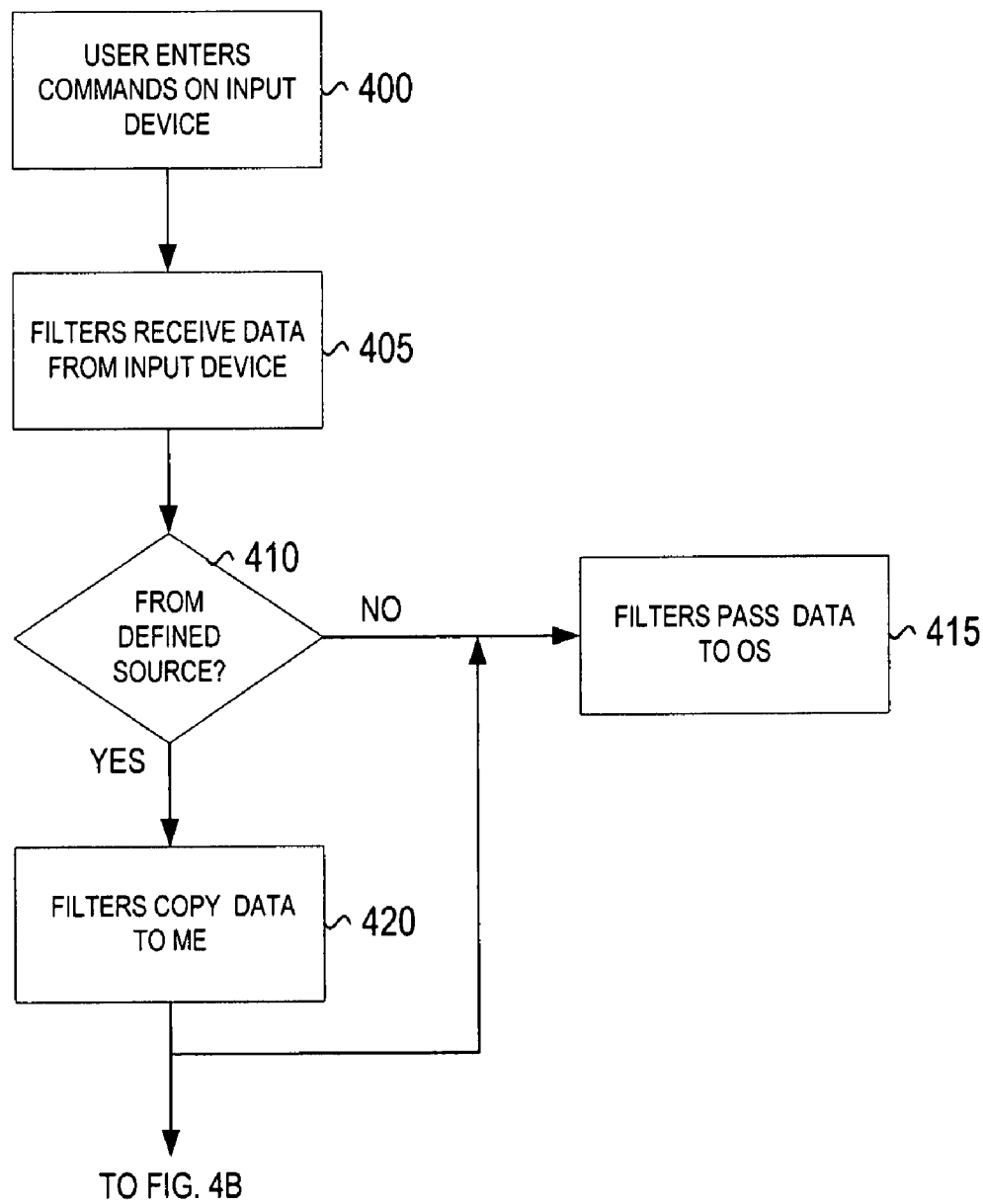
FIGS. 4A-B illustrate an example process flow for game play utilizing user command verification, according to one embodiment.
Figure 4B:
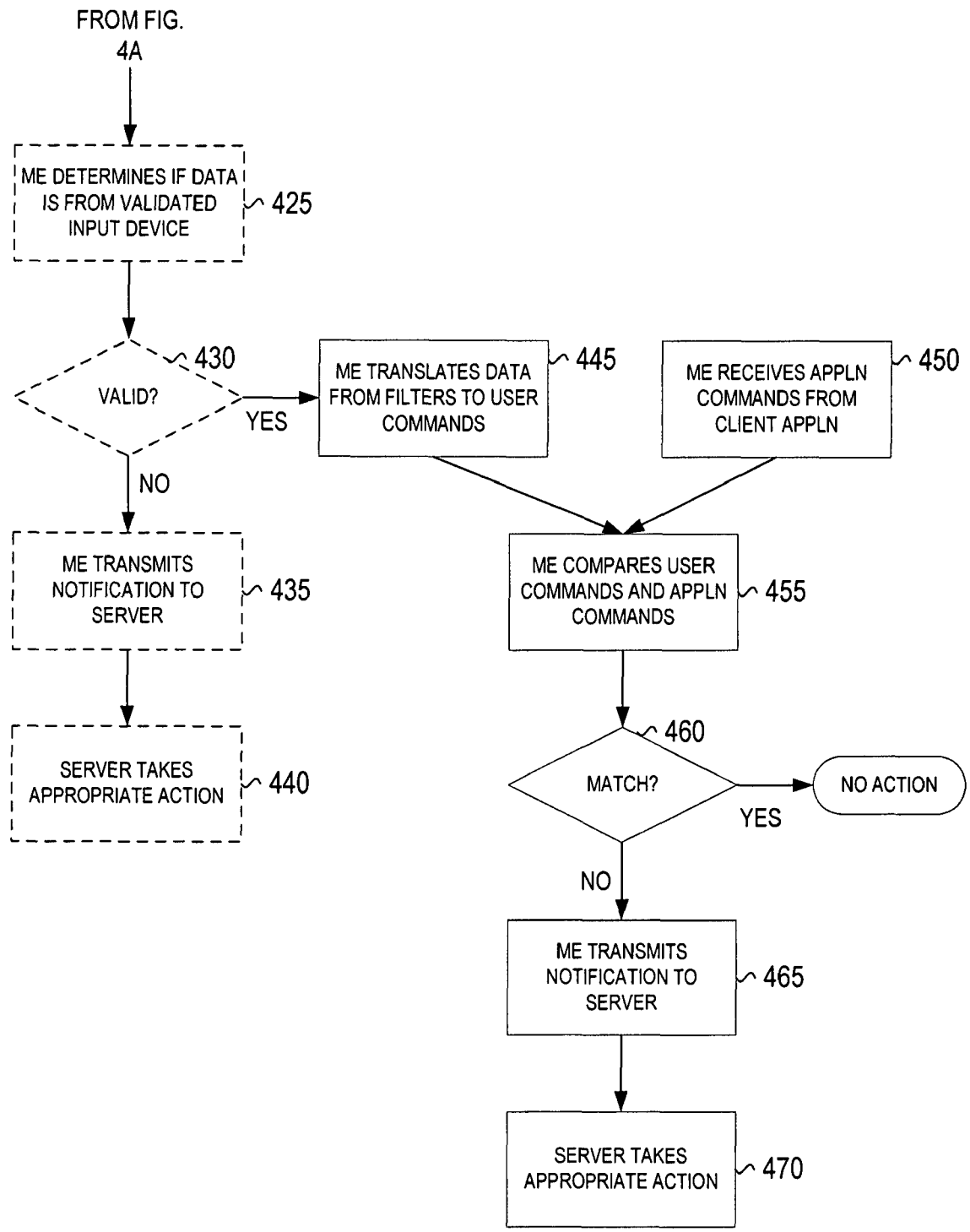

FIGS. 4A-B illustrates an example process flow for game play utilizing user command verification. The user enters commands on their input device during game play 400. The filters receive data associated with the user commands from the input device 405. The filters determine if the data received is from a defined (allowed for game play) input device 410. If the data received is not from a defined input device 410 No, the data is passed to the OS for processing 415. If the data received is from a defined input device 410 Yes, the filters duplicate the data and send the duplicate data to the ME 420 and pass the original data to the OS 415.

If the system is configured to attempt to eliminate input cheating that may occur in the input devices, the ME may optionally determine if the data received is from a validated input device 425. A valid device may be one that is included in an accepted list, one that has a certification code, or one that is not included in a banned list. If the input device is not a valid device 430 No the ME notifies the application server that the input device being used is not a valid device 435. The application server takes the appropriate action based on the notification 440. The appropriate action may include, for example, notifying the user, canceling points earned or items collected for the time the non-validated device is used, canceling game play, or more sever actions.

If the input device is valid 430 Yes, or if the input device validation feature is not enabled, the ME translates the data received from the filters into corresponding user commands 445. The translation may be based on drivers associated with the device or may be based on customized drivers that have been approved for game play. The ME receives application commands from the client application 450. The application commands are the commands that the client application processes to update the game state. The ME then compares the user commands generated therein based on data received and game inputs received from the client application 455. If the commands match 460 Yes, no action is taken. If the commands do not match 460 No, the ME notifies the application server regarding the mismatch 465. The application server takes the appropriate action based on the notification 470.

The system of FIG. 2 utilized the ICH 150 having an embedded processor (ME) to perform the user command validation. The various embodiments are not intended to be limited thereto. Rather, an add-in card (such as a PCI Express card) having an embedded general purpose processor only capable of running sanctioned code and memory and not accessible to the operating system or other programs running on the CPU (an isolated execution environment) may be utilized to perform the user command validation. The card would also have inputs for receiving the input data and filters for copying the data from appropriate input devices and passing the data to the processor. The input devices used for game play would be required to plug into this card.

A graphics card having a graphics processing unit (GPU) could also be used if the GPU was an embedded isolated execution environment processor and ran the user command verification programs. The necessary inputs and filters would also need to be added to the graphics card. The input devices would need to be plugged into the graphics card in order for the user command verification to work.

It should be noted that the system of FIG. 2 was discussed with respect to a computer 100 having a single processor (CPU) 120 but is not limited thereto. Rather, the computer 100 could include multiple CPUs or a single multi-core CPU. The client application 120 could be run on one or more of the CPUs.

It should be noted that the user command verification has been described with specific reference to on line games but is not limited thereto. Rather, the user command verification could be utilized with any client application that communicates with a remote server and where actions performed should be based on user inputs. For example, the user command verification could be implemented to verify pay-per-click advertisements, on-line purchases, time sensitive sales (e.g., bids for on-line auctions), and/or sign-up for free services are actually performed by a user rather than a cheat application (a bot).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment"

appearing in various places throughout the specification are not necessarily all referring to the same embodiment.

The various embodiments are intended to be protected broadly within the spirit and scope of the appended claims.

What is claimed:

1. A method performed by an isolated execution environment processor comprising
    receiving configuration data for an application;
    configuring a filter based on the configuration data, wherein the filter is used to monitor data received from input devices and copy the received data from the input devices associated with the application when the application is active;
    receiving the copied data from the filter;
    converting the copied data to user commands based on the configuration data;
    receiving commands used to update the application from the application;
    comparing by the isolated execution environment processor the converted user commands to the commands from the application; and
    reporting mismatching commands to a remote server.

2. The method of claim 1, wherein the receiving commands includes receiving encrypted commands and further comprising decrypting the encrypted commands.

3. The method of claim 1, wherein the reporting includes generating a mismatch command, encrypting the mismatch command, and transmitting the encrypted mismatched command.

4. The method of claim 1, wherein the isolated execution environment processor is an I/O chipset.

5. The method of claim 1, wherein the isolated execution environment processor is an add-in card having an embedded processor.

6. The method of claim 1, wherein the isolated execution environment processor is a graphics processor card.

7. The method of claim 1, further comprising validating the input devices are authorized for use with the application.

8. An apparatus comprising
    an interface to receive data from input devices;
    a filter to monitor data received at the interface; and
    an embedded processor to receive configuration data from an application, to configure the filter based on the configuration data, to receive data from the filter, to convert the data from the filter to user commands based on the configuration data, to receive application commands processed by the application from the application, to compare the user commands and the application commands, to prepare a mismatch notification when the commands do not match, and to transmit the mismatch message to a remote server associated with the application, wherein the embedded processor is an isolated execution environment.

9. The apparatus of claim 8, wherein the apparatus is an I/O chipset.

10. The apparatus of claim 8, wherein the apparatus is an add-in card.

11. The apparatus of claim 8, wherein the apparatus is a graphics card.

12. The apparatus of claim 8, wherein the embedded processor is to communicate with the application and the remote server using encryption.

13. The apparatus of claim 8, wherein the embedded processor can only run authorized programs.

14. The apparatus of claim 8, wherein the embedded processor is further to validate the input devices are authorized for use with the application.

15. A system comprising
    memory to store an on-line application;
    a central processing unit (CPU) to run the on-line application;
    at least one input device to enable a user to enter commands; and
    a card to receive the user input, the card including at least one interface to receive data corresponding to the user commands from the input devices;
        at least one filter to monitor the received data and to copy the received data user commands from input devices associated with the on-line application;
        an isolated execution environment to detect user command modifications; and
        a machine-readable storage medium comprising content, which, when executed by the isolated execution environment causes the isolated execution environment to:
            receive configuration data from the on-line application;
            configure the at least one filter based on the configuration data;
            receive the copied data corresponding to the user commands associated with the on-line application from the filters;
            convert the copied data to the corresponding user commands, wherein the converting includes utilizing any input translations defined in the configuration data;
            receive application commands from the on-line application, wherein the application commands were processed by the on-line application;
            compare the user commands to the application commands; and
            detect the user command modifications when the user commands and the application commands do not match wherein the content, which, when executed by the isolated execution environment further causes the isolated execution environment to transmit a notification of the user command modifications to a remote server associated with the on-line application.

16. The system of claim 15, wherein the card is an input controller hub chipset.

17. The system of claim 15, wherein the card is an add-in PCI Express card.

18. The system of claim 15, wherein the card is a graphics card.

19. The system of claim 15, wherein the isolated execution environment is an embedded processor.

20. The system of claim 15, wherein the content, which, when executed by the isolated execution environment further causes the isolated execution environment to communicate with the CPU and the remote server using encryption.

21. The system of claim 15, wherein the isolated execution environment can only run authorized programs.

22. The system of claim 15, wherein the content, which, when executed by the isolated execution environment further causes the isolated execution environment to validate the at least one input device is authorized for use with the on-line application.

* * * * *

UNITED STATES PATENT AND TRADEMARK OFFICE
CERTIFICATE OF CORRECTION

| | | |
|---|---|---|
| PATENT NO. | : 7,792,960 B2 | Page 1 of 1 |
| APPLICATION NO. | : 11/998836 | |
| DATED | : September 7, 2010 | |
| INVENTOR(S) | : Stephen D. Goglin et al. | |

It is certified that error appears in the above-identified patent and that said Letters Patent is hereby corrected as shown below:

On the Title page Item (56) under "OTHER PUBLICATIONS", line 3, delete "Negtgames" and insert -- Netgames --, therefor.

In column 8, line 14, in claim 15, after "data" delete "user commands from input devices".

In column 8, line 40, in claim 15, delete "match" and insert -- match, --, therefor.

Signed and Sealed this

Thirtieth Day of November, 2010

David J. Kappos
*Director of the United States Patent and Trademark Office*